United States Patent
Wu et al.

(10) Patent No.: US 12,500,261 B2
(45) Date of Patent: Dec. 16, 2025

(54) LITHIUM ION CONDUCTING SOLID MATERIALS

(71) Applicants: BASF SE, Ludwigshafen am Rhein (DE); University of Waterloo, Waterloo (CA)

(72) Inventors: Xiaohan Wu, Ludwigshafen (DE); Laidong Zhou, Waterloo (CA); Linda Nazar, Waterloo (CA); Jörn Kulisch, Ludwigshafen (DE)

(73) Assignees: BASF SE, Ludwigshafen (DE); UNIVERSITY OF WATERLOO, Waterloo (CA)

(*) Notice: Subject to any disclaimer, the term of this patent is extended or adjusted under 35 U.S.C. 154(b) by 875 days.

(21) Appl. No.: 17/629,143

(22) PCT Filed: Jul. 21, 2020

(86) PCT No.: PCT/EP2020/070526
§ 371 (c)(1),
(2) Date: Jan. 21, 2022

(87) PCT Pub. No.: WO2021/013824
PCT Pub. Date: Jan. 28, 2021

(65) Prior Publication Data
US 2022/0255126 A1    Aug. 11, 2022

(30) Foreign Application Priority Data
Jul. 24, 2019  (EP) .................... 19188154

(51) Int. Cl.
H01M 10/0562  (2010.01)
H01M 10/0525  (2010.01)

(52) U.S. Cl.
CPC .... H01M 10/0562 (2013.01); H01M 10/0525 (2013.01); *H01M 2300/008* (2013.01); *H01M 2300/0091* (2013.01)

(58) Field of Classification Search
CPC ........ H01M 10/0562; H01M 10/0525; H01M 2300/008; H01M 2300/0091;
(Continued)

(56) References Cited

U.S. PATENT DOCUMENTS 8,075,865 B2   12/2011  Deiseroth
2010/0290969 A1*  11/2010  Deiseroth ......... H01M 10/0562
                                                    423/303

(Continued)

OTHER PUBLICATIONS

Hao Min Chen et al: "Stability and ionic mobility in argyrodite-related lithium-ion solid electrolytes", Physical Chemistry Chemical Physics, vol. 17, No. 25, Jan. 1, 2015 (Jan. 1, 2015), pp. 16494-16506.

(Continued)

*Primary Examiner* — Matthew T Martin
*Assistant Examiner* — Bartholomew A Hornsby
(74) *Attorney, Agent, or Firm* — Armstrong Teasdale LLP

(57) ABSTRACT

Described are a solid material which has ionic conductivity for lithium ions, a process for preparing said solid material, a use of said solid material as a solid electrolyte for an electrochemical cell, a solid structure selected from the group consisting of a cathode, an anode and a separator for an electrochemical cell comprising the solid material, and an electrochemical cell comprising such solid structure.

15 Claims, 2 Drawing Sheets

(58) Field of Classification Search
CPC ....... H01M 10/052; H01M 2300/0068; H01M 4/62; Y02E 60/10; C01B 17/22; C01G 30/003; C01P 2002/72; C01P 2006/40
See application file for complete search history.

(56) References Cited

U.S. PATENT DOCUMENTS

| | | | |
|---|---|---|---|
| 2011/0081580 A1* | 4/2011 | Stadler | H01M 10/0562 429/319 |
| 2015/0357675 A1* | 12/2015 | Ohtomo | C03C 4/18 429/319 |
| 2016/0365604 A1* | 12/2016 | Mimura | H01M 10/0562 |
| 2018/0309167 A1* | 10/2018 | Kaga | H01M 4/661 |
| 2020/0185768 A1* | 6/2020 | Kang | H01M 10/052 |

OTHER PUBLICATIONS

International Search Report for PCT/EP2020/070526 mailed Jan. 28, 2021, 3 pages.
Intenational Preliminary Report on Patentability for PCT/EP2020/070526 mailed Jun. 15, 2021, 7 pages.
Marvin A. Kraft et al. Inducing High Ionic Conductivity in the Lithium Superionic Argyrodites $Li_{6+x}P_{1-x}Ge_xS_51$ for All-Solid-State Batteries , J. Am. Chem. Soc. 2018, 140, 16330-16339.
Zhou, "Synthesis and Characterization of New Solid-State Li-Supersonic Conductors", Excerpts of a thesis presented to the University of Waterloo, 13 pages (2017).

\* cited by examiner

LITHIUM ION CONDUCTING SOLID MATERIALS

CROSS REFERENCE TO RELATION APPLICATIONS

The present application is a national stage entry under 35 U.S.C. § 371 of International Application No. PCT/EP2020/070526 filed on Jul. 21, 2020, which claims priority to European Application No. 19188154.9, filed on Jul. 24, 2019, the entire contents of which are incorporated by reference in their entirety.

FIELD OF INVENTION

Described are a solid material which has ionic conductivity for lithium ions, a process for preparing said solid material, a use of said solid material as a solid electrolyte for an electrochemical cell, a solid structure selected from the group consisting of a cathode, an anode and a separator for an electrochemical cell comprising the solid material, and an electrochemical cell comprising such solid structure.

BACKGROUND

Due to the wide-spread use of all solid state lithium batteries, there is an increasing demand for solid state electrolytes having a high conductivity for lithium ions. An important class of such solid electrolytes are lithium argyrodites.

U.S. Pat. No. 8,075,865 B2 discloses lithium argyrodites of formula (*)

$$Li_{(12-n-x)}B^{n+}X^{2-}{}_{6-x}Y^{-} \quad (*)$$

wherein
B is selected from the group consisting of P, As, Ge, Ga, Sb, Si, Sn, Al, In, Ti, V, Nb, and Ta,
X is selected from the group consisting of S, Se, and Te,
Y is selected from the group consisting of Cl, Br, I, F, CN, OCN, SCN, and $N_3$,
and $0 \leq x \leq 2$. For the specific compound $Li_6PS_5I$ an ionic conductivity of about $7*10^{-3}$ S/cm is reported in U.S. Pat. No. 8,075,865 B2.

Marvin A. Kraft et al. (J. Am. Chem. Soc. 2018, 140, 16330-16339) disclose lithium argyrodites of formula $$Li_{6+x}Ge_xP_{1-x}S_5I$$

wherein x=0, 0.15, 0.25, 0.3, and 0.6, resp. Depending on x and on the preparation method, sintered pellets of such lithium argyrodites may exhibit ionic conductivities up to 5.4±0.8 mS/cm or even 18.4±2.7 mS/cm.

There is an ongoing need for lithium conductors which exhibit suitable ionic conductivity for application as solid electrolyte in all-solid state lithium batteries as well as electrochemical stability in direct contact with lithium metal.

SUMMARY OF THE INVENTION

It is an objective of the present disclosure to provide a solid material which may be used as a solid electrolyte for an electrochemical cell. In addition, there is provided a process for preparing said solid material, a use of said solid material as a solid electrolyte for an electrochemical cell, a solid structure selected from the group consisting of a cathode, an anode and a separator for an electrochemical cell comprising the solid material, and an electrochemical cell comprising such solid structure, wherein said solid structure comprises said solid material.

DETAILED DESCRIPTION OF THE INVENTION

Figure 1:
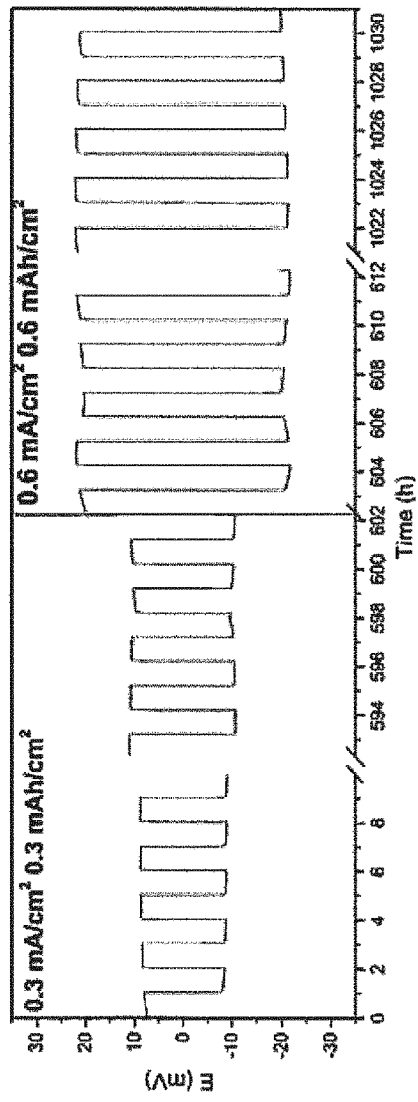
FIG. 1 illustrates the electrochemical stability of a of the studied solid electrolyte in direct contact with lithium metal during extended stripping and plating in a symmetric cell.

According to a first aspect, there is provided a solid material having a composition according to general formula (I)

$$Li_{7+x-y}M_xSb_{1-x}S_{8-y}X_y \quad (I)$$

wherein
M is one or more selected from the group consisting of Si, Ge and Sn;
$0 \leq x \leq 1$;
X is one or more selected from the group consisting of Cl, Br and I;
$0.05 \leq y \leq 2$.

Surprisingly it has been found that solid materials as defined above may exhibit favorable lithium ion conductivity as well as electrochemical stability in direct contact with lithium metal.

Specific materials according to the above-defined first aspect have a composition according to formula (I) wherein X is I (iodine), i.e. a composition according to formula (Ia)

$$Li_{7+x-y}M_xSb_{1-x}S_{8-y}I_y \quad (Ia)$$

wherein M, x and y have the same meaning as defined above for formula (I).

A first group of solid materials according to the above-defined first aspect has a composition according to formula (I) wherein x=0, i.e. no element M selected from the group consisting of Si, Ge and Sn is present. Thus, solid materials of said first group have a composition according to formula (Ib)

$$Li_{7-y}SbS_{6-y}X_y \quad (Ib)$$

wherein X and y have the same meaning as defined above for formula (I).

Certain solid materials of said first group have a composition according to formula (Ib) wherein $0.5 \leq y \leq 1.5$, more preferably $0.8 \leq y \leq 1.2$.

Certain solid materials of said first group have a composition according to formula (Ib) wherein X is I.

Certain specific solid materials of said first group have a composition according to formula (Ib) wherein $0.5 \leq y \leq 1.5$ and X is I. Further specific solid materials of said first group have a composition according to formula (Ib) wherein $0.8 \leq y \leq 1.2$ and X is I.

A second group of solid materials according to the above-defined first aspect has a composition according to formula (I) wherein $0 \leq x \leq 1$, i.e. one or more element M selected from the group consisting of Si, Ge and Sn is present.

Certain solid materials of said second group have a composition according to formula (I) wherein $0.05 \leq x \leq 1$.

Certain solid materials of said second group have a composition according to formula (I) wherein $0.5 \leq y \leq 1.5$, preferably $0.8 \leq y \leq 1.2$.

Certain solid materials of said second group have a composition according to formula (I) wherein 0.05≤x≤1 and 0.5≤y≤1.5, preferably 0.8≤y≤1.2.

Certain solid materials of said second group have a composition according to formula (I) wherein X is I.

Certain specific solid materials of said second group have a composition according to formula (I) wherein 0.05≤1, 0.5≤y≤1.5, and X is I. Further specific solid materials of said second group have a composition according to formula (I) wherein 0.05≤x≤1, 0.8≤y≤1.2, and X is I.

Solid materials of the second group wherein M is Si have a composition according to formula (Ic)

wherein
0<x≤1;
and X and y have the same meaning as defined above for formula (I).

Certain solid materials of said second group wherein M is Si have a composition according to formula (Ic) wherein 0.1≤x≤0.8, preferably 0.2≤x≤0.7, further preferably 0.3≤x≤0.7, more preferably 0.4≤x≤0.7.

Certain solid materials of said second group wherein M is Si have a composition according to formula (Ic) wherein 0.5≤y≤1.5, preferably 0.8≤y≤1.2, more preferably 0.9 to 1.1.

Certain solid materials of said second group wherein M is Si have a composition according to formula (Ic) wherein 0.1≤x≤0.8, preferably 0.2≤x≤0.7, and 0.5≤y≤1.5, preferably 0.8≤y≤1.2, more preferably 0.2≤x≤0.7 and 0.8≤y≤1.2, further preferably, 0.3≤x≤0.7 and 0.8≤y≤1.2, still further preferably, 0.3≤x≤0.7 and 0.9≤y≤1.1, most preferably, 0.4≤x≤0.7 and 0.9≤y≤1.1.

Certain solid materials of said second group wherein M is Si have a composition according to formula (Ic) wherein X is I.

Certain specific solid materials of said second group wherein M is Si and X is I have a composition according to formula (Ic) wherein 0.1≤x≤0.8 and 0.5≤y≤1.5. Further specific solid materials of said second group wherein M is Si and X is I have a composition according to formula (Ic) wherein 0.2≤x≤0.7 and 0.8≤y≤1.2, further preferably, 0.3≤x≤0.7 and 0.8≤y≤1.2, still further preferably 0.3≤x≤0.7 and 0.9≤y≤1.1, most preferably 0.4≤x≤0.7 and 0.9≤y≤1.1.

Solid materials of the second group wherein M is Ge have a composition according to formula (Id)

wherein
0<x≤1;
and X and y have the same meaning as defined above for formula (I).

Certain solid materials of said second group wherein M is Ge have a composition according to formula (Id) wherein 0.1≤x≤0.5, preferably 0.2≤x≤0.4.

Certain solid materials of said second group wherein M is Ge have a composition according to formula (Id) wherein 0.5≤y≤1.5, preferably 0.8≤y≤1.2, more preferably 0.9 to 1.1.

Certain solid materials of said second group wherein M is Ge have a composition according to formula (Id) wherein 0.1≤x≤0.5, preferably 0.2≤x≤0.4, and 0.5≤y≤1.5, preferably 0.8≤y≤1.2, more preferably 0.2≤x≤0.4 and 0.8≤y≤1.2, further preferably 0.2≤x≤0.4 and 0.9≤y≤1.1.

Certain solid materials of said second group wherein M is Ge have a composition according to formula (Id) wherein X is I.

Certain specific solid materials of said second group wherein M is Ge and X is I have a composition according to formula (Id) wherein 0.1≤x≤0.5 and 0.5≤y≤1.5. Further specific solid materials of said second group wherein M is Ge and X is I have a composition according to formula (Id) wherein 0.2≤x≤0.4 and 0.8≤y≤1.2, further preferably 0.2≤x≤0.4 and 0.9≤y≤1.1.

Solid materials of the second group wherein M is Sn have a composition according to formula (Ie)

wherein
0<x≤1;
and X and y have the same meaning as defined above for formula (I).

Certain solid materials of said second group wherein M is Sn have a composition according to formula (Ie) wherein 0.1≤x≤0.3, preferably 0.15≤x≤0.25.

Certain solid materials of said second group wherein M is Sn have a composition according to formula (Ie) wherein 0.5≤y≤1.5, preferably 0.8≤y≤1.2, more preferably 0.9 to 1.1.

Certain solid materials of said second group wherein M is Sn have a composition according to formula (Ie) wherein 0.1≤x≤0.3, preferably 0.15≤x≤0.25, and 0.5≤y≤1.5, preferably 0.8≤y≤1.2, more preferably 0.15≤x≤0.25 and 0.8≤y≤1.2, further preferably 0.15≤x≤0.25 and 0.9≤y≤1.1.

Certain solid materials of said second group wherein M is Sn have a composition according to formula (Ie) wherein X is I.

Certain specific solid materials of said second group wherein M is Sn and X is I have a composition according to formula (Ie) wherein 0.1≤x≤0.3 and 0.5≤y≤1.5. Further specific solid materials of said second group wherein M is Sn and X is I have a composition according to formula (Ie) wherein 0.15≤x≤0.25 and 0.8≤y≤1.2, preferably 0.15≤x≤0.25 and 0.9≤y≤1.1.

A solid material according to the above-defined first aspect may be crystalline as detectable by the X-ray diffraction technique. A solid material is referred to as crystalline when it exhibits a long range order that is characteristic of a crystal, as indicated by the presence of clearly defined reflections in its X-ray diffraction pattern. In this context, a reflection is considered as clearly defined if its intensity is more than 10% above the background.

A crystalline solid material according to the above-defined first aspect may have an argyrodite structure characterized by the cubic space group F-43 m.

A crystalline solid material according to the above-defined first aspect may be accompanied by secondary phases and/or impurity phases having a composition not according to general formula (I) as defined above. In such case, the volume fraction of the phase formed of the crystalline solid material having a composition according to general formula (I) may be 50% or more, sometimes 80% or more, preferably 90% or more, most preferably 95% or more, based on the total volume of the solid material according to the above-defined first aspect and all secondary phases and impurity phases.

If present, the secondary phases and impurity phases mainly consist of the precursors used for preparing the solid material, e.g. LiX (wherein X is as defined above) and $Li_2S$, and sometimes impurity phases which may originate from impurities of the precursors. For details of preparing a solid material according to the above defined first aspect, see the information provided below in the context of the second aspect of this disclosure.

In certain cases, a solid material according to the above-defined first aspect is in the form of a polycrystalline powder, or in the form of single crystals.

A solid material according to the above-defined first aspect may have an ionic conductivity of 0.1 mS/cm or more, preferably 1 mS/cm or more, further preferably 10 mS/cm or more, in each case at a temperature of 25° C. The ionic conductivity is determined in the usual manner known in the field of battery materials development by means of electrochemical impedance spectroscopy (for details see examples section below).

At the same time, a solid material according to the above-defined first aspect may have an almost negligible electronic conductivity. More specifically the electronic conductivity may be at least 3 orders of magnitude lower than the ionic conductivity, preferably at least 5 orders of magnitude lower than the ionic conductivity. In certain cases, a solid material according to the above-defined first aspect exhibits an electronic conductivity of $10^{-9}$ S/cm or less. The electronic conductivity is determined in the usual manner known in the field of battery materials development by means of direct-current (DC) polarization measurements at different voltages.

A solid material according to the above-defined first aspect may exhibit promising electrochemical stability in direct contact with lithium metal over a duration of at least 1,000 hours, resulting in a steady voltage profile at even high current and capacity under conditions of stripping and plating in a symmetric cell (for details see examples section below). This is an important advantage because it may become possible to apply electrochemical cell configurations wherein lithium metal is in direct contact with a solid electrolyte in the form of a solid material according to the above-defined first aspect so that a protection layer between the lithium metal and the solid electrolyte can be omitted. Thus, complexity of the configuration and of the manufacturing process of electrochemical cells comprising metallic lithium as the electroactive material is reduced.

Preferred solid materials according to the first aspect as defined above are those having one or more of the specific features disclosed above.

According to a second aspect, there is provided a process for obtaining a solid material according to the above-defined first aspect. Said process comprises the following process steps:
  a) preparing or providing a reaction mixture comprising the precursors
    (1) $Li_2S$
    (2) one or both of $Sb_2S_3$ and elemental Sb
    (3) one or more compounds LiX wherein X is selected from the group consisting of Cl, Br and I
    (4) elemental S
    (5) optionally one or more species selected from the group consisting of M in elemental form and sulfides of M, wherein in each case M is selected from the group consisting of Si, Ge and Sn
    wherein in said reaction mixture the molar ratio of the elements Li, M, Sb, S and X matches general formula (I)
  b) heat-treating the reaction mixture in a temperature range of from 400° C. to 600° C. for a total duration of 40 hours to 200 hours so that a reaction product is formed
  c) cooling the reaction product formed in step b) so that a solid material having a composition according to general formula (I) is obtained.

In step a) of the process according to the above-defined second aspect, a reaction mixture comprising precursors for the reaction product to be formed in step b) is provided. Said precursors are
  (1) $Li_2S$
  (2) one or more of $Sb_2S_3$ and elemental Sb as the source of antimony
  (3) one or more compounds LiX wherein X is selected from the group consisting of Cl, Br and I
  (4) elemental sulfur S
  (5) optionally one or more species selected from the group consisting of Si, Ge and Sn in elemental form and sulfides of Si, Ge and Sn.

In said reaction mixture the molar ratio of the elements Li, M, Sb, S and X matches general formula (I). The reaction mixture provided or prepared in step a) may consist of precursors (1) through (4) resp. of precursors (1) through (5) as defined above.

One or both of Sb in elemental form (antimony) or $Sb_2S_3$ (precursor (2)) may serve as the source of Sb for the solid material having a composition according to formula (I) as defined above. In each case, additional sulfur (precursor (4)) is necessary to oxidize the elemental Sb (oxidation number 0) resp. the Sb in $Sb_2S_3$ (oxidation number of Sb: +3) up to the oxidation number +5. $Sb_2S_3$ is preferred as precursor (2).

One or more species selected from the group consisting of Si, Ge and Sn in elemental form and sulfides of Si, Ge and Sn (precursor (5)) may serve as the source for M (as defined above) in the solid material having a composition according to formula (I) as defined above. Additional sulfur (precursor (4)) is necessary to oxidize the element M up to the oxidation number +4 in case the oxidation number of the element M (as defined above) in precursor (5) is lower than +4. This is the case if M in elemental form is used as the precursor (5). Among the sulfides of M, those wherein the oxidation state of M is +4 ($MS_2$) are preferred. If $MS_2$ is used as precursor (5) no additional sulfur is necessary to oxidize the element M up to the oxidation number +4.

Thus, the amount of elemental sulfur (precursor (4)) in the reaction mixture provided or prepared in step a) depends on the oxidation state of Sb in precursor (2) and on the oxidation state of M in precursor (5), if precursor (5) is present. Based on stoichiometric considerations the skilled person can easily calculate the amount of elemental sulfur necessary for the reaction mixture provided or prepared in step a).

In certain processes according to the above-defined second aspect, the precursor (3) is LiI. Such processes are suitable for preparing solid materials having a composition according to general formula (Ia) as defined above.

Thus, the precursors for a solid material having a composition according to general formula (Ia) are
  (1) $Li_2S$
  (2) one or more of $Sb_2S_3$ and elemental Sb, preferably $Sb_2S_3$
  (3) LiI
  (4) elemental sulfur S
  (5) optionally one or more species selected from the group consisting of Si, Ge and Sn in elemental form and sulfides of Si, Ge and Sn.

In certain processes according to the above-defined second aspect, the reaction mixture provided or prepared in step a) does not comprise any precursor (5) selected from the group consisting of Si, Ge and Sn in elemental form and sulfides of Si, Ge and Sn. Said reaction mixture provided or prepared in step a) may consist of precursors (1) through (4) as defined above. Such processes are suitable for preparing solid materials having a composition according to general formula (Ib) as defined above. In specific processes for preparing solid materials having a composition according to general formula (Ib) the precursor (3) is LiI.

Thus, the precursors for a solid material having a composition according to general formula (Ib) are
(1) $Li_2S$
(2) one or more of $Sb_2S_3$ and elemental Sb, preferably $Sb_2S_3$
(3) one or more compounds LiX wherein X is selected from the group consisting of Cl, Br and I, preferably LiI
(4) elemental sulfur S.

In certain processes according to the above-defined second aspect, the reaction mixture provided or prepared in step a) comprises one or more precursors (5) selected from the group consisting of Si, Ge and Sn in elemental form and sulfides of Si, Ge and Sn. Said reaction mixture provided or prepared in step a) may consist of precursors (1) through (5) as defined above. Such processes are suitable for preparing solid materials of the second group as defined above. In specific processes for preparing such solid materials the precursor (3) is LiI.

Thus, in certain processes according to the above-defined second aspect the precursors are
(1) $Li_2S$, (2) $Sb_2S_3$ or elemental Sb, (3) LiI, (4) elemental S
and
(5) one of elemental Si, elemental Ge, elemental Sn, $SiS_2$, $GeS_2$ and $SnS_2$.

In certain specific processes according to the above-defined second aspect, the reaction mixture provided or prepared in step a) comprises one or more precursors (5) selected from the group consisting of elemental Si and sulfides of Si. Said reaction mixture provided or prepared in step a) may consist of precursors (1) through (4) as defined above and precursor (5) in the form of one or more species selected from the group consisting of elemental Si and sulfides of Si. Among sulfides of Si, $SiS_2$ is preferred. Elemental Si (silicon) is preferred as precursor (5). Such processes are suitable for preparing solid materials having a composition according to general formula (Ic) as defined above. In specific processes for preparing solid materials having a composition according to general formula (Ic) the precursor (3) is LiI.

Thus, the precursors for a solid material having a composition according to general formula (Ic) are
(1) $Li_2S$
(2) one or more of $Sb_2S_3$ and elemental Sb, preferably $Sb_2S_3$
(3) one or more compounds LiX wherein X is selected from the group consisting of Cl, Br and I, preferably LiI
(4) elemental sulfur S
(5) one or more species selected from the group consisting of Si and sulfides of Si, preferably elemental Si.

In certain specific processes according to the above-defined second aspect, the reaction mixture provided or prepared in step a) comprises one or more precursors (5) selected from the group consisting of elemental Ge (germanium) and sulfides of Ge. Said reaction mixture provided or prepared in step a) may consist of precursors (1) through (4) as defined above and precursor (5) in the form of one or more species selected from the group consisting of elemental Ge and sulfides of Ge. Among sulfides of Ge, $GeS_2$ is preferred. $GeS_2$ is preferred as precursor (5). Such processes are suitable for preparing solid materials having a composition according to general formula (Id) as defined above. In specific processes for preparing solid materials having a composition according to general formula (Id) the precursor (3) is LiI.

Thus, the precursors for a solid material having a composition according to general formula (Id) are
(1) $Li_2S$
(2) one or more of $Sb_2S_3$ and elemental Sb, preferably $Sb_2S_3$
(3) one or more compounds LiX wherein X is selected from the group consisting of Cl, Br and I, preferably LiI
(4) elemental sulfur S
(5) one or more species selected from the group consisting of elemental Ge and sulfides of Ge, preferably $GeS_2$.

In certain specific processes according to the above-defined second aspect, the reaction mixture provided or prepared in step a) comprises one or more precursors (5) selected from the group consisting of elemental Sn (tin) and sulfides of Sn. Said reaction mixture provided or prepared in step a) may consist of precursors (1) through (4) as defined above and precursor (5) in the form of one or more species selected from the group consisting of elemental Sn and sulfides of Sn. Among sulfides of Sn, $SnS_2$ is preferred. $SnS_2$ is preferred as precursor (5). Such processes are suitable for preparing solid materials having a composition according to general formula (Ie) as defined above. In specific processes for preparing solid materials having a composition according to general formula (Ie) the precursor (3) is LiI.

Thus, the precursors for a solid material having a composition according to general formula (Ie) are
(1) $Li_2S$
(2) one or more of $Sb_2S_3$ and elemental Sb, preferably $Sb_2S_3$
(3) one or more compounds LiX wherein X is selected from the group consisting of Cl, Br and I, preferably LiI
(4) elemental sulfur S
(5) one or more species selected from the group consisting of elemental Sn and sulfides of Sn, preferably $SnS_2$.

In step a) mixing may be performed by means of grinding. Grinding can be done using any suitable means.

It is useful that in step a) any handling is performed under a protective gas atmosphere.

The reaction mixture which is prepared or provided in step a) may be formed into pellets, which are heat-treated in step b). Then, a solid material in the form of pellet or chunks is obtained, which may be ground into powder for further processing.

In step b) of the process according to the above-defined second aspect, the reaction mixture prepared in process step a) is heat-treated to enable the reaction of the precursors. Said reaction is considered to be substantially a solid state reaction, i.e. it occurs with the reaction mixture in the solid state.

Heat-treating may be performed in a closed vessel. The closed vessel may be a sealed quartz tube or any other type of container which is capable of withstanding the temperature of the thermal treatment and is not subject to reaction with any of the precursors, such as a glassy carbon crucible or a tantalum crucible.

Step b) may comprise two or more stages of heat treating, wherein in each stage a different temperature in the range of from 400° C. to 600° C., preferably 450° C. to 550° C. is applied. Typically, in the second and each following stage the temperature of the heat treatment is lower than in the preceding stage. The duration of said stages may be the same or different, wherein the total duration of heat treatment in the temperature range of from 400° C. to 600° C. for a duration of 40 hours to 200 hours.

Heating of the reaction mixture up to the desired temperature is preferably performed using a heating rate of 1 to 10° C. per minute. In case the temperature is changed in the course of step b), the temperature change rate is preferably 1 to 10° C. per minute.

In a specific process for preparing a material having a composition according to formula (Ic), the heat treatment is carried out for a duration of 6 to 8 days at temperatures in the range of from 450° C. to 600° C., preferably 500° C. to 550° C.

In a specific process for preparing a material having a composition according to formula (Id), the heat treatment is carried out at a first stage having a duration of 10 to 30 hours at temperatures in the range of from 500° C. to 600° C., preferably 500° C. to 550° C., followed by a second stage having a duration of 80 to 120 hours at temperatures in the range of from 400° C. to 500° C., preferably 400° C. to 450° C., wherein during the second stage the temperature is lower than during the first stage.

In a specific process for preparing a material having a composition according to formula (Ie), the heat treatment is carried out for a duration of 40 to 60 hours at temperatures in the range of from 400° C. to 600° C., preferably 500° C. to 550° C.

When the duration of the heat treatment of step b) is completed, the formed reaction product is allowed to cool down (step c)). Thus, a solid material having a composition according to general formula (I) is obtained.

Cooling of the reaction product is preferably performed using a cooling rate of 1 to 10° C. per minute.

A preferred process according to the above-defined second aspect further comprises the step of
  d) annealing the solid material obtained in step c) in a temperature range of from 400° C. to 600° C. for a duration of 40 hours to 200 hours.

The solid material obtained in step c) may be ground and formed into pellets, which are annealed in step d). Then, an annealed material is obtained in the form of pellet or chunks, which may be ground into powder for further processing.

Annealing (step d)) may serve to cure structural defects in the solid material obtained in step c), and/or to fuse together the material grains of the solid material obtained in step c).

Regarding preferred temperature and time ranges, heating rates and devices for step d), the same applies as disclosed above for process step b).

When the annealing time of step d) is completed, the annealed material is allowed to cool down.

It has been found that as the result of the annealing treatment (step d)) the ionic conductivity of the obtained material will be increased.

Preferred processes according to the second aspect as defined above are those having one or more of the specific features disclosed above.

A solid material according to the above-defined first aspect resp. obtained by the process according to the above-defined second aspect can be used as a solid electrolyte for an electrochemical cell. Herein the solid electrolyte may form a component of a solid structure for an electrochemical cell, wherein said solid structure is selected from the group consisting of cathode, anode and separator. Accordingly, a solid material according to the above-defined first aspect resp. obtained by the process according to the above-defined second aspect can be used alone or in combination with additional components for producing a solid structure for an electrochemical cell, such as a cathode, an anode or a separator.

Thus, the present disclosure further provides the use of a solid material according to the above-defined first aspect resp. obtained by the process according to the above-defined second aspect as a solid electrolyte for an electrochemical cell. More specifically, the present disclosure further provides the use of a solid material according to the above-defined first aspect resp. obtained by the process according to the above-defined second aspect as a component of a solid structure for an electrochemical cell, wherein said solid structure is selected from the group consisting of cathode, anode and separator.

In the context of the present disclosure, the electrode where during discharging a net negative charge occurs is called the anode and the electrode where during discharging a net positive charge occurs is called the cathode. The separator electronically separates a cathode and an anode from each other in an electrochemical cell.

The cathode of an all-solid-state electrochemical cell usually comprises beside an active cathode material as a further component a solid electrolyte. Also the anode of an all-solid-state electrochemical cell usually comprises a solid electrolyte as a further component beside an active anode material.

The form of the solid structure for an electrochemical cell, in particular for an all-solid-state lithium battery, depends in particular on the form of the produced electrochemical cell itself.

The present disclosure further provides a solid structure for an electrochemical cell, wherein the solid structure is selected from the group consisting of cathode, anode and separator, wherein the solid structure for an electrochemical cell comprises a solid material according to the above-defined first aspect resp. obtained by the process according to the above-defined second aspect. More specifically, there is provided a solid structure as defined above wherein a solid material according to the above-defined first aspect resp. obtained by the process according to the above-defined second aspect is in direct contact with lithium metal.

The present disclosure further provides an electrochemical cell comprising a solid material according to the above-defined first aspect resp. obtained by the process according to the above-defined second aspect. In said electrochemical cell, the solid material according to the above-defined first aspect resp. obtained by the process according to the above-defined second aspect may form a component of one or more solid structures selected from the group consisting of cathode, anode and separator. More specifically, there is provided an electrochemical cell as defined above wherein in certain preferred cases a solid material according to the above-defined first aspect resp. obtained by the process according to the above-defined second aspect may be in direct contact with lithium metal.

The above-defined electrochemical cell may be a rechargeable electrochemical cell comprising the following constituents
  α) at least one anode,
  β) at least one cathode,
  γ) at least one separator,
wherein at least one of the three constituents is a solid structure selected from the group consisting of cathode, anode and separator comprising a solid material according to the above-defined first aspect resp. obtained by the process according to the above-defined second aspect.

Suitable electrochemically active cathode materials and suitable electrochemically active anode materials are known in the art. In an electrochemical cell as described above the anode α) may comprise graphitic carbon, metallic lithium or a metal alloy comprising lithium as the anode active material. Due to its superior electrochemical stability in direct contact with lithium metal, in certain preferred cases in a solid structure as defined above a solid material according to the above-defined first aspect resp. obtained by the process according to the above-defined second aspect may be in direct contact with an anode comprising lithium metal, so that no protecting layer is needed between them.

Electrochemical cells as described above may be alkali metal containing cells, especially lithium-ion containing cells. In lithium-ion containing cells, the charge transport is effected by $Li^+$ ions.

The electrochemical cell may have a disc-like or a prismatic shape. The electrochemical cells can include a housing that can be from steel or aluminum.

A plurality of electrochemical cells as described above may be combined to an all solid-state battery, which has both solid electrodes and solid electrolytes. A further aspect of the present disclosure refers to batteries, more specifically to an alkali metal ion battery, in particular to a lithium ion battery comprising at least one electrochemical cell as described above, for example two or more electrochemical cells as described above. Electrochemical cells as described above can be combined with one another in alkali metal ion batteries, for example in series connection or in parallel connection. Series connection is preferred.

The electrochemical cells resp. batteries described herein can be used for making or operating cars, computers, personal digital assistants, mobile telephones, watches, camcorders, digital cameras, thermometers, calculators, laptop BIOS, communication equipment or remote car locks, and stationary applications such as energy storage devices for power plants. A further aspect of this disclosure is method of making or operating cars, computers, personal digital assistants, mobile telephones, watches, camcorders, digital cameras, thermometers, calculators, laptop BIOS, communication equipment, remote car locks, and stationary applications such as energy storage devices for power plants by employing at least one inventive battery or at least one inventive electrochemical cell.

A further aspect of the present disclosure is the use of the electrochemical cell as described above in motor vehicles, bicycles operated by electric motor, robots, aircraft (for example unmanned aerial vehicles including drones), ships or stationary energy stores.

The present disclosure further provides a device comprising at least one inventive electrochemical cell as described above. Preferred are mobile devices such as are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers.

The invention is illustrated further by the following examples which are not limiting.

EXAMPLES

1. Preparation of Materials

Step a)

For the preparation of comparison materials having a composition according to formula (I) reaction mixtures comprising the precursors (each in powder form)
(1) $Li_2S$
(2) $Sb_2S_3$
(3) LiI
(4) elemental sulfur S
(5) optionally one of elemental Si, $GeS_2$, and $SnS_2$
were prepared by mixing together precursors (1) through (4) resp. (1) to (5) according to the targeted stoichiometric ratio by means of grinding in a mortar under a protective gas atmosphere.

For the preparation of comparison materials reaction mixtures comprising the precursors (each in powder form)
1) $Li_2S$
2) $P_2S_5$ and optionally $Sb_2S_3$
3) LiI
4) elemental sulfur S (when the reaction mixture comprised $Sb_2S_3$)
were prepared by mixing together precursors (1) through (4) according to the targeted stoichiometric ratio in a mortar under a protective gas atmosphere.

Steps b) and c)

Each reaction mixture prepared in step a) was formed into a pellet which was subject to heat-treatment in step b). For the heat treatment each of the pelletized reaction mixtures was placed in a glassy-carbon crucible in a sealed quartz tube under vacuum.

The reaction mixtures wherein precursor (5) is Si were heat-treated at 500° C. for 7 days (0<x<0.5, wherein x has the same meaning as defined above for formula (I)), resp. at 550° C. for 7 days (0.5≤x≤0.7, wherein x has the same meaning as defined above for formula (I)).

The reaction mixtures wherein precursor (5) is $GeS_2$ were heat-treated at a first stage at 550° C. for 20 hours, then the temperature was shifted with a temperature change rate of 5° C./min to 450° C.°, and the reaction mixture was heat treated at a second stage at 450° C. for 100 hours.

The reaction mixture wherein precursor (5) is $SnS_2$ was heat-treated at 500° C. for 50 hours The reaction mixtures not containing any precursor (5) were heat-treated at 500° C. for 100 hours.

Heating of the reaction mixture up to the desired temperature was performed using a heating rate 5° C. per minute in each case.

When the above-specified duration of the heat treatment in step b) was completed, the formed reaction product was allowed to cool down to room temperature with a temperature change rate of 5° C./min (step c)). Thus, solid materials each having a composition according to general formula (I) were obtained.

Step d)

Some of the obtained solid materials wherein M=Si (for details see below) obtained in step c) were ground and each formed into a pellet which was subject to annealing step d).

The materials were annealed at 500° C. for 7 days. Heating of the materials up to the desired temperature was performed using a heating rate 5° C. per minute in each case.

For details of the composition of the obtained materials, see the table 1 below.

The obtained materials were in the form of pellet or chunks, which were then ground into powder for further processing.

2. Ionic Conductivity

Ion conductivities were measured by electrochemical impedance spectroscopy (EIS). Typically, 150-200 mg of powder of the material was placed between two stainless steel rods and pressed into a 10 mm diameter pellet by a hydraulic press at 3 metric tons for 3 min in an Argon-filled glovebox. EIS experiments were performed with 100 mV amplitude within a frequency range of 1 MHz-10 mHz using a VMP3 potentiostat/galvanostat (Bio-Logic).

The lithium ion conductivity measured at 25° C. of all samples is given in table 1 below.

The materials of composition $Li_6PS_5I$, $Li_6Sb_{0.1}P_{0.9}S_5I$, $Li_6Sb_{0.3}P_{0.7}S_5I$, $Li_6Sb_{0.5}P_{0.5}S_5I$, and $Li_6Sb_{0.8}P_{0.2}S_5I$ are comparison materials. Interestingly, partial substitution of phosphorus by antimony results in a decrease of the ionic conductivity when the molar ratio Sb:P is 1:1 or lower.

Indeed, this finding actually points against substitution of phosphorus by antimony. Surprisingly, further increase of the molar ratio Sb:P results in a reversal of this trend, and complete replacement of P by Sb (composition $Li_6SbS_5I$) results in an increase of the ionic conductivity by almost one order of magnitude, compared to the material having a composition $Li_6PS_5I$. Partial replacement of Sb by Si, Ge or Sn results in a further increase of the ionic conductivity, wherein Si has the most significant effect and Sn the lowest. Moreover, as evident from table 1, the annealing treatment (step d) as described above) results in an increase of the ionic conductivity, compared to the corresponding material having the same composition which was prepared without annealing step d).

TABLE 1

| Composition | Ionic conductivity (mS/cm) (material preparation without annealing step d)) | Ionic conductivity (mS/cm) (material preparation including annealing step d)) |
|---|---|---|
| $Li_6PS_5I$ | $2.9 \times 10^{-3}$ | |
| $Li_6Sb_{0.1}P_{0.9}S_5I$ | $1.4 \times 10^{-3}$ | |
| $Li_6Sb_{0.3}P_{0.7}S_5I$ | $1.2 \times 10^{-3}$ | |
| $Li_6Sb_{0.5}P_{0.5}S_5I$ | $2.1 \times 10^{-3}$ | |
| $Li_6Sb_{0.8}P_{0.2}S_5I$ | $5.5 \times 10^{-3}$ | |
| $Li_6SbS_5I$ | $2.8 \times 10^{-2}$ | |
| $Li_{6.1}Si_{0.1}Sb_{0.9}S_5I$ | $1.1 \times 10^{-3}$ | |
| $Li_{6.2}Si_{0.2}Sb_{0.8}S_5I$ | $6.9 \times 10^{-2}$ | $8.8 \times 10^{-2}$ |
| $Li_{6.3}Si_{0.3}Sb_{0.7}S_5I$ | 0.93 | 1.03 |
| $Li_{6.4}Si_{0.4}Sb_{0.6}S_5I$ | 3.9 | 4.14 |
| $Li_{6.5}Si_{0.5}Sb_{0.5}S_5I$ | 7.8 | 9.98 |
| $Li_{6.6}Si_{0.6}Sb_{0.4}S_5I$ | 9.4 | 14.8 |
| $Li_{6.7}Si_{0.7}Sb_{0.3}S_5I$ | 11.2 | 12.6 |
| $Li_{6.2}Sn_{0.2}Sb_{0.8}S_5I$ | 0.12 | |
| $Li_{6.2}Ge_{0.2}Sb_{0.8}S_5I$ | 0.87 | |
| $Li_{6.4}Ge_{0.4}Sb_{0.6}S_5I$ | 6.3 | |

3. Stability Against Lithium 80 mg of $Li_{6.7}Si_{0.7}Sb_{0.3}S_5I$ powder was filled into a poly(ether ether ketone) cylinder and cold-pressed pressed at 3 metric tons for 1 min so that a pellet having 10 mm diameter was obtained. On both sides of the pellet, Li foil (99.9%, Sigma-Aldrich) with a diameter of 10 mm was attached so that a solid state Li|$Li_{6.7}Si_{0.7}Sb_{0.3}S_5I$|Li symmetric cell was obtained. Then the cell was subject to constant uniaxial pressure using the screw of a stainless steel framework with 4 Nm torque.

For the evaluation of the stability of the solid electrolyte $Li_{6.7}Si_{0.7}Sb_{0.3}S_5I$, the solid state Li|$Li_{6.7}Si_{0.7}Sb_{0.3}S_5I$|Li symmetric cell was cycled at different current and capacity (0.3 mA/cm² and 0.3 mAh/cm² for 600 h; and then 0.6 mA/cm², 0.6 mAh/cm² for another 430 hours). As evident from FIG. 1, a substantially steady voltage profile was obtained. This indicates electrochemical stability of the studied solid electrolyte in direct contact with lithium metal over a duration of at least about 1,000 hours under conditions of stripping and plating in a symmetric cell as described above.

4. Structure Analysis

Powder X-ray diffraction (XRD) measurements were conducted at room temperature using a PANalytical Empyrean diffractometer with Cu-Kα radiation equipped with a PIXcel bidimensional detector. XRD patterns for phase identification were obtained in Debye-Scherrer geometry, with samples sealed in sealed in 0.3 mm glass capillaries under argon.

Figures 2A, 2B:
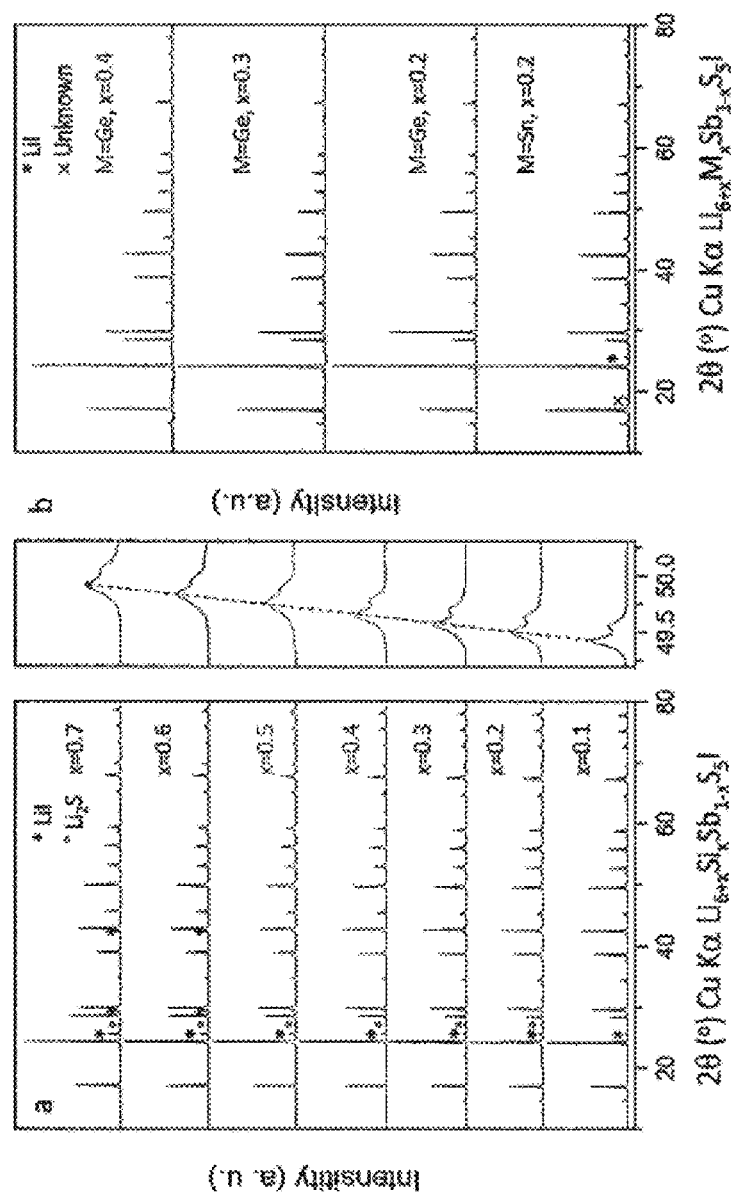
FIG. 2a and FIG. 2b illustrate powder X-ray diffraction (XRD) patterns of several solid materials having a composition according to formula (I) with M equal to Si, Ge or Sn, respectively.

XRD patterns of several solid materials having a composition according to formula (I) with M=Si, Ge or Sn, resp., are shown in FIGS. 2a and 2b. In each case, the cubic space group F-43m was indexed that is adopted by most other argyrodites.

The XRD patterns in FIG. 2a show that the solid materials having a composition according to formula (I) with M=Si are polycrystalline powders, and very minor fractions of LiI and $Li_2S$ are present beside the material having a composition according to formula (I). Increasing the amount of Si (parameter x) results in an increasing fraction of said secondary phases (mainly originating from the precursors LiI and $Li_2S$).

In the XRD patterns of the solid materials with M=Si, the argyrodite peaks shift to smaller d-spacing (smaller distance between the crystal planes) with increasing $Si^{4+}$ content (see enlarged part of FIG. 2a). This indicates successful substitution of $Sb^{5+}$ with the smaller $Si^{4+}$ ion.

The XRD patterns in FIG. 2b show that the materials having a composition according to formula (I) with M=Ge are phase-pure polycrystalline powders and the material having a composition according to formula (I) with M=Sn is accompanied by trace amounts of unknown impurity and LiI in the XRD pattern.

The invention claimed is:

1. A solid material having a composition according to general formula (I)

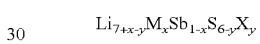

wherein

M is one or more selected from the group consisting of Si, Ge and Sn;

$0 \leq x < 1$;

X is one or more selected from the group consisting of Cl, Br and I;

$0.05 \leq y \leq 2$.

2. The solid material according to claim 1, wherein $0.05 \leq x < 1$ and/or $0.5 \leq y \leq 1.5$.

3. The solid material according to claim 2, wherein M is Si; $0.1 \leq x \leq 0.8$; $0.5 \leq y \leq 1.5$.

4. The solid material according to claim 2, wherein M is Ge; $0.1 \leq x \leq 0.5$; $0.5 \leq y \leq 1.5$.

5. The solid material according to claim 2, wherein M is Sn; $0.1 \leq x \leq 0.3$; $0.5 \leq y \leq 1.5$.

6. The solid material according to claim 1, wherein X is I.

7. The solid material according to claim 1, wherein the solid material comprises a crystalline phase having the argyrodite structure.

8. A process for preparing a solid material as defined in claim 1, comprising a) preparing or providing a reaction mixture comprising the precursors
   (1) $Li_2S$
   (2) one or both of $Sb_2S_3$ and elemental Sb
   (3) one or more compounds LiX wherein X is selected from the group consisting of Cl, Br and I
   (4) elemental S (5) optionally one or more species selected from the group consisting of M in elemental form and sulfides of M, wherein in each case M is selected from the group consisting of Si, Ge and Sn wherein in the reaction mixture the molar ratio of the elements Li, M, Sb, S and X matches general formula (I)

b) heat-treating the reaction mixture in a temperature range of from 400° C. to 600° C. for a total duration of 40 hours to 200 hours to obtain a reaction product c) cooling the reaction product obtained in step b) so that a solid material having a composition according to general formula (I) is obtained.

9. The process according to claim 8, further comprising d) annealing the solid material obtained in step c) in a temperature range of from 400° C. to 600° C. for a duration of 40 hours to 200 hours.

10. The process according to claim 8, wherein the precursors are (1) $Li_2S$,
(2) $Sb_2S_3$,
(3) LiI,
(4) S and (5) one of elemental Si, elemental Ge, elemental Sn, $SiS_2$, $GeS_2$ and $SnS_2$.

11. A solid electrolyte for an electrochemical cell comprising the solid material according to claim 1.

12. A solid structure for an electrochemical cell, wherein the solid structure is selected from the group consisting of cathode, anode and separator, wherein the solid structure for an electrochemical cell comprises a solid material according to claim 1.

13. An electrochemical cell comprising a solid material according to claim 1.

14. The electrochemical cell according to claim 13, wherein the solid material is a component of a solid structure, and wherein the solid structure is selected from the group consisting of cathode, anode and separator.

15. The solid electrolyte for an electrochemical cell according to claim 11, wherein the solid electrolyte is a component of a solid structure for an electrochemical cell selected from the group consisting of cathode, anode, and separator.

* * * * *